May 17, 1932.  C. H. HILL  1,859,260

ELECTRICAL APPARATUS

Original Filed Dec. 31, 1927

Inventor:
Charles H. Hill,
by Chaebr V. Mullar
His Attorney.

Patented May 17, 1932

1,859,260

UNITED STATES PATENT OFFICE

CHARLES H. HILL, OF DREXEL HILL, PENNSYLVANIA, ASSIGNOR TO GENERAL ELECTRIC COMPANY, A CORPORATION OF NEW YORK

ELECTRICAL APPARATUS

Original application filed December 31, 1927, Serial No. 243,977. Divided and this application filed January 2, 1930. Serial No. 417,940.

My invention relates to electrical apparatus and particularly to switching apparatus of the metal-clad type wherein current carrying parts are immersed in an insulating fluid and insulated thereby from an outer metallic and conducting enclosing structure.

An object of my invention is the provision of an improved metal-clad apparatus having a construction which is sturdy, which facilitates convenience of assembly and inspection, and which is efficient in operation.

This application is a division of my application Serial No. 243,977 for electric switching apparatus, filed December 31, 1927.

My invention will be more fully set forth in the following description, referring to the accompanying drawings, and the features of novelty which characterize my invention will be pointed out with particularity in the claims annexed to and forming a part of this specification.

Figure 1:
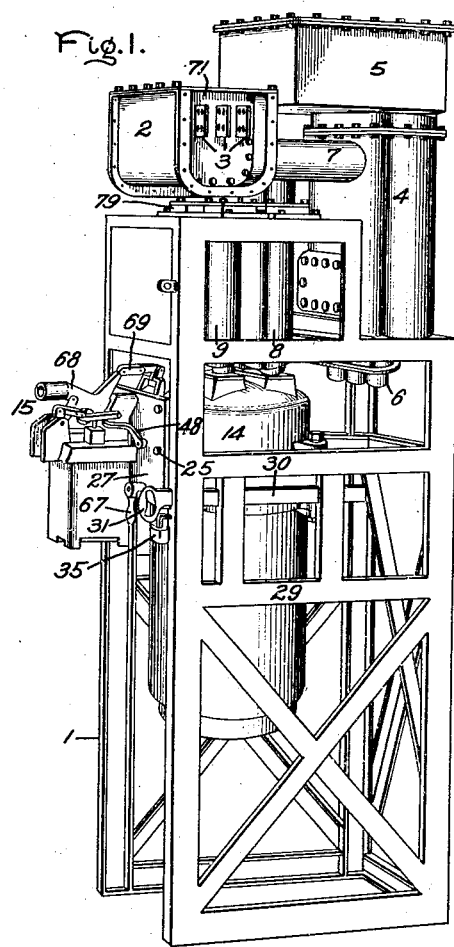
Figure 2:
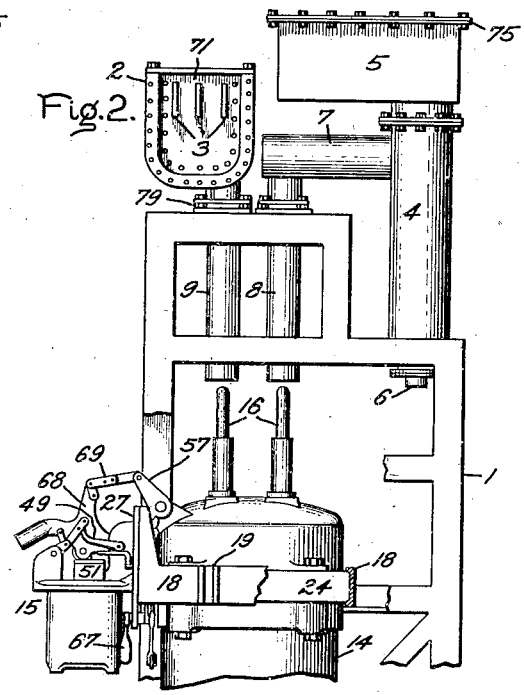
Figure 4:
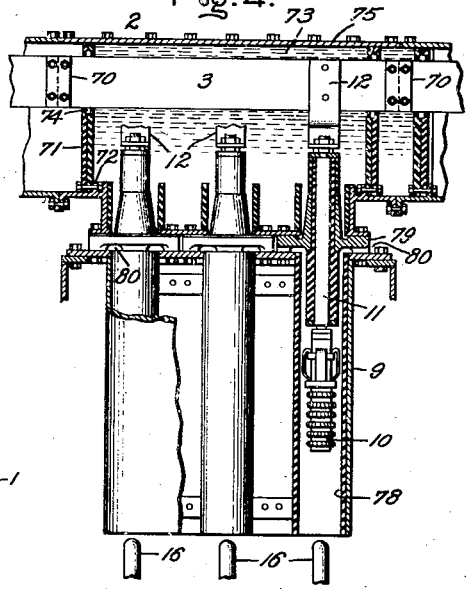
Figure 3:
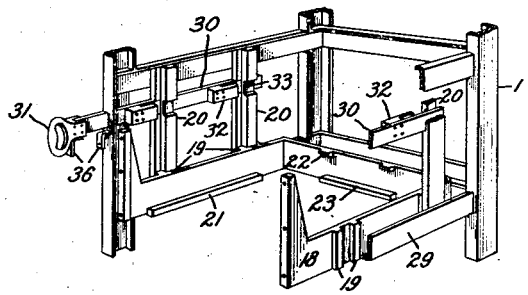

Referring to the drawings, Fig. 1 is a perspective view of a switching apparatus embodying my invention; Fig. 2 is a partial side elevation thereof, partly in section; Fig. 3 is a detailed view, partly in section, of apparatus illustrated in Figs. 1 and 2, and Fig. 4 is a fragmentary elevational view, partly in section, of metal clad structure embodying my invention.

In the drawings there is illustrated by way of example a unit of electrical switching apparatus wherein the frame 1 is shown as fabricated from structural steel members welded together, forming a supporting structure for the main switch unit, the bus bars, the disconnecting switch contacts, and the transformers, etc. associated therewith.

A plurality of similar units may be arranged in a switching station with their frames standing side by side in a row either with their backs against a wall or otherwise or, if preferred, two such rows may be arranged with the apparatus placed back to back. In addition to the metal frame, the live portions of the apparatus are enclosed in metallic casings from which they are separated in most parts by insulating oil or compound, hence the term "metal clad" which has commonly been applied to this type of switching apparatus.

Supported on the top of the frame 1 is the bus bar chamber or trough 2 extending through which are shown the three bus bars 3 of a three phase circuit. Also supported in the frame are the casings 4 and 5 containing respectively the usual current and potential transformers, connections 6 being shown at the bottom of casing 4 for incoming or outgoing cables, depending on the use of the apparatus. The connections between the current transformers in casing 4 and the bus bars are enclosed by the casing 7. Two flattened tubular casings 8 and 9 each enclose a group of three fixed disconnecting switch contacts 10 supported by rods 11, the rods of one group of which connect by straps 12 with the respective bus bars 3. The main switch unit comprising the oil switch 14, its operating mechanism 15 and the movable contacts 16 of the disconnecting switch is removably mounted in the frame and adapted to be raised and lowered therein whereby the disconnecting switch contacts may be caused respectively to engage and disengage each other. I employ any suitable truck for raising and lowering the main switch unit and for transporting it when separated from the frame.

That portion of the frame which encloses the main switch unit is open at the front through which the unit is removable and within the frame is the yoke 18 having on its two sides the guide lugs 19 which engage on opposite sides of the guides 20 fixed to the frame. Internally the yoke has the guides 21 on its two sides which are engaged by suitable lugs or projections on the oil switch. At the rear, the yoke is provided with lugs 22 and 23 having their adjacent faces inclined.

The oil switch has a projecting portion 24 having correspondingly inclined faces which when the switch is pushed rearwardly engage lugs 22 and 23 and firmly secure the switch at the rear to the yoke. At the front the oil switch is secured to the yoke by the screws 25 which pass through the plate 27 forming a part of the switch into the ends of the yoke. By drawing up on these screws 25 the switch is pushed rearwardly against the lugs 22 and 23 and when thus engaged in the yoke the switch is firmly held against such violent movements as might injure the disconnecting switch contacts. In Fig. 3 the oil switch is shown removed and the yoke is shown in its lowermost position when it rests upon the angle 29. After the oil switch has been brought up to the frame by the carriage, it is slid into place in the yoke and the clamping screws 25 firmly secure it in the yoke. The switch and yoke are then raised together by suitable lifting means preferably mounted on the carriage in a well known manner and which need not here be described. As the switch is raised, disconnecting switch contacts 16 and 10 engage the one within the other whereby the main or oil switch contacts are connected to the circuit. When the switch and the yoke have been raised the proper distance they are locked in the raised position by the locking bars 30. Each bar has a handle 31 and plates 32 which are adapted to slide in grooves 33 formed in the guides 20. In the locking position the plates 32 engage the lugs 19 and support the switch and yoke. As a result of this construction the locking bars may be comparatively light and need be moved only enough to shift the plates from one position to the other. The bars may be secured in locking position by means such for example as a padlock 35 applied to the members 36.

Inasmuch as the disconnecting switch contacts 10 and 16 are not adapted for interrupting the circuit controlled by the oil switch or even for finally closing the same, there may be provided suitable means, such as disclosed in the parent application previously referred to, for automatically tripping open the oil switch and also for locking the switch operating mechanism against movement to closed circuit position in the event that one should begin to lower the oil switch when in closed circuit position.

I have illustrated the main oil switch provided with a solenoid actuated operating mechanism of a well known construction comprising the main operating lever 68 which may be operated either by the solenoid or by hand and the adjustable link 69 connecting it to the crank 57 of the switch.

As shown in Fig. 1 the three bus bars 3 are enclosed in the bus chamber or trough 2. When a plurality of switching apparatus such as that illustrated are arranged side by side in a row, the respective bus bars and troughs are connected one with another to form a continuous length of trough with continuous bus bars therein. Each trough section is formed with flanges at the ends whereby the sections may be bolted together and the end of the bus bars have bolt holes by which the bus connecting plates 70 may be bolted thereto. The bus bars are supported in proper position in the trough by the partitions 71, each shown as comprising two layers or plates which are set back from the ends of the trough and bolted along the periphery to an inwardly extending flange 72 on the trough. These partitions not only support the bus bars but serve to retain the insulating liquid 73 in all of that portion of the trough between them. For making the joints tight between the partitions and the bus bars I have shown gaskets 74 surrounding the bus bars and lying in recesses in the adjacent faces of the partitions. Gaskets may also be used if necessary between the partitions and the flanges to which they are bolted. The top of the trough is closed by a cover plate 75 bolted to the trough and by the removal of this plate access is had to the connections between bus bars. In accordance with this construction any one apparatus of a row may be disconnected and removed from the rest it being necessary only to drain out the insulating liquid contained in the relatively small end portions or spacing chambers of the troughs, the main or body portions of the troughs being undisturbed.

Referring now particularly to Fig. 4, it will be seen that flattened metal casings 8 and 9 each enclose a group of three fixed disconnecting switch contacts 10 and each is supported by a flange on its upper end which is bolted to the frame. Within each casing are the three insulation tubes 78 each enclosing a contact 10 and its insulated connecting rod 11. Each rod and contact is supported by a member 79 which is bolted to the flange of a casing and to which is bolted the trough 2. In order that the heat produced at the disconnecting switch contacts may in all cases be dissipated with sufficient rapidity, I have provided a ventilating space between the insulating tubes 78 and fixed contacts and parts associated therewith and in the bases of the supporting member 79 I have provided lateral openings 80 which communicate with those spaces. Since the lower ends of the tubes 78 are never entirely closed a cooling current of air is free to flow up past each of the disconnecting switch contacts and cool the same.

It shall, of course, be understood that the bus chamber 2 may be adapted for other portions of the circuit and that its use is not restricted to a metal-clad switching unit as illustrated.

What I claim as new and desire to secure by Letters Patent of the United States is:

1. In an electric switching metal clad unit, a bus bar trough section adapted to contain insulating liquid and arranged to be connected at its ends to similar horizontally disposed trough sections, spaced bus bars in said section adapted to be connected with corresponding bus bars in adjacent sections, detachable cover structure for the upper side of said trough section and transverse partitions mounted within said trough section adjacent the opposite ends thereof and making a liquid tight joint with the bus bars and the trough section.

2. In an electric switching metal clad unit, a bus bar trough section adapted to contain insulating liquid and arranged to be connected at its ends to trough sections of similar units, spaced bus bars in said section adapted to be connected to corresponding bus bars in adjacent sections, and insulating bus bar supporting partitions in said section spaced from the ends thereof forming a liquid tight joint with the bus bars and the trough section, said partitions forming with the adjacent partitions of adjoining units spacing chambers.

3. In a metal-clad switchgear unit, bus bar insulating structure comprising a trough-like section, said section having transverse partitions at the opposite ends thereof thereby forming an individual fluid-containing receptacle, sectionalized bus bars disposed within said receptacle and immersed in an insulating oil contained therein to form an oil-filled sectionalized unit, and detachable cover structure for each sectionalized unit.

4. Electrical metal-clad structure comprising a plurality of bus bars, said bus bars each having individual sections adapted to be joined together to form a continuous conductor, a metallic trough-like receptacle within which the respective phases of a particular section of the bus bars are disposed, each of said receptacles having end walls and cover structure forming an individual receptacle and metal-clad unit for the bus bar sections, and an insulating oil in said receptacle within which the bus bar sections are immersed, said receptacle and bus bar sections adapted to be united at either end to similar metal-clad units.

5. Electrical metal-clad structure for a polyphase bus bar system wherein the bus bars of respective phases each comprise individual sections united to form a continuous conductor, comprising a metallic trough-like section within which corresponding individual sections of the bus bars are disposed, partitions of insulating material set back from opposite ends of each trough section forming therewith a receptacle containing an insulating oil for insulating the bus bars from each other and from said trough section, said insulating partitions having openings through which the ends of the bus bar sections extend, and means at opposite ends of each trough section for uniting similar trough sections to each other to form a continuous metal-clad structure wherein corresponding ends of bus bar sections are united within spacing chambers formed by adjacent partitions of adjoining trough sections.

In witness whereof, I have hereunto set my hand this 30th day of December, 1929.

CHARLES H. HILL.